United States Patent [19]

Wiersema et al.

[11] Patent Number: 4,580,325

[45] Date of Patent: Apr. 8, 1986

[54] WINDING TEMPORARY POSITIONING APPARATUS FOR A DYNAMOELECTRIC GENERATOR

[75] Inventors: Dale T. Wiersema, Bellevue; Fred Kirschensteiner, Forest Hills, both of Pa.

[73] Assignee: Westinghouse Electric Corp., Pittsburgh, Pa.

[21] Appl. No.: 701,262

[22] Filed: Feb. 13, 1985

[51] Int. Cl.⁴ ............................................. B25B 27/14
[52] U.S. Cl. .................................................... 29/281.1
[58] Field of Search ................................. 29/259-262, 29/281.1, 281.3, 281.5, 281.6

[56] References Cited

U.S. PATENT DOCUMENTS

| | | | |
|---|---|---|---|
| 1,736,506 | 11/1929 | Munson et al. | 29/262 |
| 2,376,721 | 5/1945 | Piper | 29/261 |
| 4,084,305 | 4/1978 | Chang | 29/261 |

Primary Examiner—Robert C. Watson
Attorney, Agent, or Firm—R. S. Lombard

[57] ABSTRACT

A winding temporary positioning apparatus for a dynamoelectric generator. The apparatus is particularly useful during rewinding of a generator of the type that has wedges maintained in grooves in the stator core slots holding the windings in position. The apparatus of the present invention includes adjustable arms shaped at the bottom end of the arms to engage the grooves thereby temporarily holding the windings in place until permanent wedges are installed.

6 Claims, 4 Drawing Figures

WINDING TEMPORARY POSITIONING APPARATUS FOR A DYNAMOELECTRIC GENERATOR

BACKGROUND OF THE INVENTION

This invention relates generally to dynamoelectric generators and, in particular, to a winding temporary positioning apparatus for such a generator. In dynamoelectric generators such as hydroelectric generators the windings or coils are maintained in position within slots in the stator core. The stator core is provided with grooves at the air gap end of the slots and insulating wedges are shaped to engage the grooves and thereby hold the windings in position as is known in the art. When rewinding a generator such as a hydroelectric generator, the old windings must be removed and new windings inserted in the slots. It is necessary to first remove the wedges holding the windings in place. After the new windings are inserted in the slots it is necessary to temporarily hold the new windings in the slot until permanent wedges can be inserted in the groove. The prior art typically accomplishes this by using two permanent wedges, one at the top and one at the bottom of the slot as temporary holding devices. It has been found that this method is time consuming as the wedges have to be shimmed and driven into the slot for a tight fit and then driven back out to enable permanent wedging operations.

SUMMARY OF THE INVENTION

The present invention provides a winding means temporary positioning apparatus for a dynamoelectric generator, such as a hydroelectric generator. The generator typically comprises a rotor, a stator core coaxially encircling the rotor. The stator core includes a plurality of thin laminations stacked to form the core. The stator core has a plurality of slots therethrough spaced at equal intervals around the inner diameter of the core.

Winding means is positioned in the slots. Each of the slots at one end thereof proximate the inner diameter of the stator core forms an air gap for magnetic flux, as is known in the art. The stator core along opposite sides of each of the slots proximate the air gap end has a groove of predetermined shape positioned a predetermined distance from the air gap end of each slot. Wedge means are provided engageable in the grooves for maintaining the winding means in position. The wedge means is typically made of a non-conducting insulating material, such as micarta, a registered trademark of the Westinghouse Electric Corporation.

The apparatus of the present invention comprises frame means. The frame means includes a pair of substantially parallel wall members having a top support member affixed thereto and spaced therebetween such that the wall members are spaced a predetermined distance greater than the width of each of the slots. Adjustable jaw means are provided comprising a pair of adjustable jaw members positioned proximate an end of the top support member with a substantial portion of the jaw members housed within the frame. A first jaw member of the pair of adjustable jaw members is shaped at the bottom end thereof to engage the stator core groove on one side of each of the slots. A second jaw member of the pair of adjustable jaw members being shaped at the bottom end thereof to engage the groove on the other side of each of the slots. Control means are provided for engaging and disengaging the jaw means in the stator groove. The apparatus further comprises adjustable pad means sized to fit within the slots and adjustable to engage and disengage the winding means, whereby during installation of the winding means in each of the slots, the jaw members of the apparatus engage the grooves on opposite sides of the slots and the pad means is adjusted to engage the winding means to temporarily position the winding means in place while installing the wedge means.

Preferably the control means comprises first handle means. The first handle means includes a first handle member positioned above the top support member. A first threaded shaft member is affixed to the handle member at the top end thereof. The top member has first aperture means therethrough in predetermined position. The top member has first threading means about the periphery of the first aperture. The first threaded shaft member of the first handle is positioned to pass through the first aperture and engage the first threading. The first threaded shaft proximate the bottom end thereof has a hinge means affixed thereto. The hinge comprises a central holding member affixed to the bottom end of the first threaded shaft, movable arm members affixed at one end thereof to the central holding member and at the other end thereof to one of the jaw members proximate the center thereof. The arm members are rotatable at both ends thereof.

Preferably the jaw members at the upper ends thereof are affixed to the top member. The jaw members having an upper portion of predetermined length and a lower portion of predetermined length. The lower portion and upper portion of the arm members forming a predetermined angle therebetween. The lower portion of the jaw members on one side thereof closest to one of the wall members having a notch therein a predetermined distance from the bottom end of the jaw member. The notch is of predetermined size and shape. An engagement finger is formed by the bottom portion of the jaw member between the notch and the bottom end of the jaw member in a shape to engage the stator core groove.

Preferably the top member has a second aperture means passing therethrough. The top member has second threading means around the periphery of the second aperture means. Adjustable pad means are provided comprising a pad member having a width less than the width of each of the slots. Second handle means are provided including a second handle member positioned above the top support member. A second elongated threaded shaft member is affixed at the top end thereof to the second handle member. The second elongated threaded shaft member engages the second threading means. The elongated threaded shaft member at the bottom thereof is affixed to the pad member.

The present invention is a quick-acting tool that locks into the stator core groove and applies pressure to the winding through the adjustable pad means. The apparatus fits the entire range of stator slot sizes from 0.6 to 1.3 inches through four adjustable jaw members that are adjustable within this range.

The apparatus can also be used during permanent wedge insertion as a center wedge holding fixture for holding shim material in place when driving the center wedge. This was previously typically done with two U-shaped spring clips which had a tendency to release from the slot unexpectedly causing frustration of workmen and time delays.

BRIEF DESCRIPTION OF THE DRAWINGS

For a better understanding of the invention reference may be had to the accompanying drawings, in which.

BRIEF DESCRIPTION OF THE PREFERRED EMBODIMENTS

Figure 1:
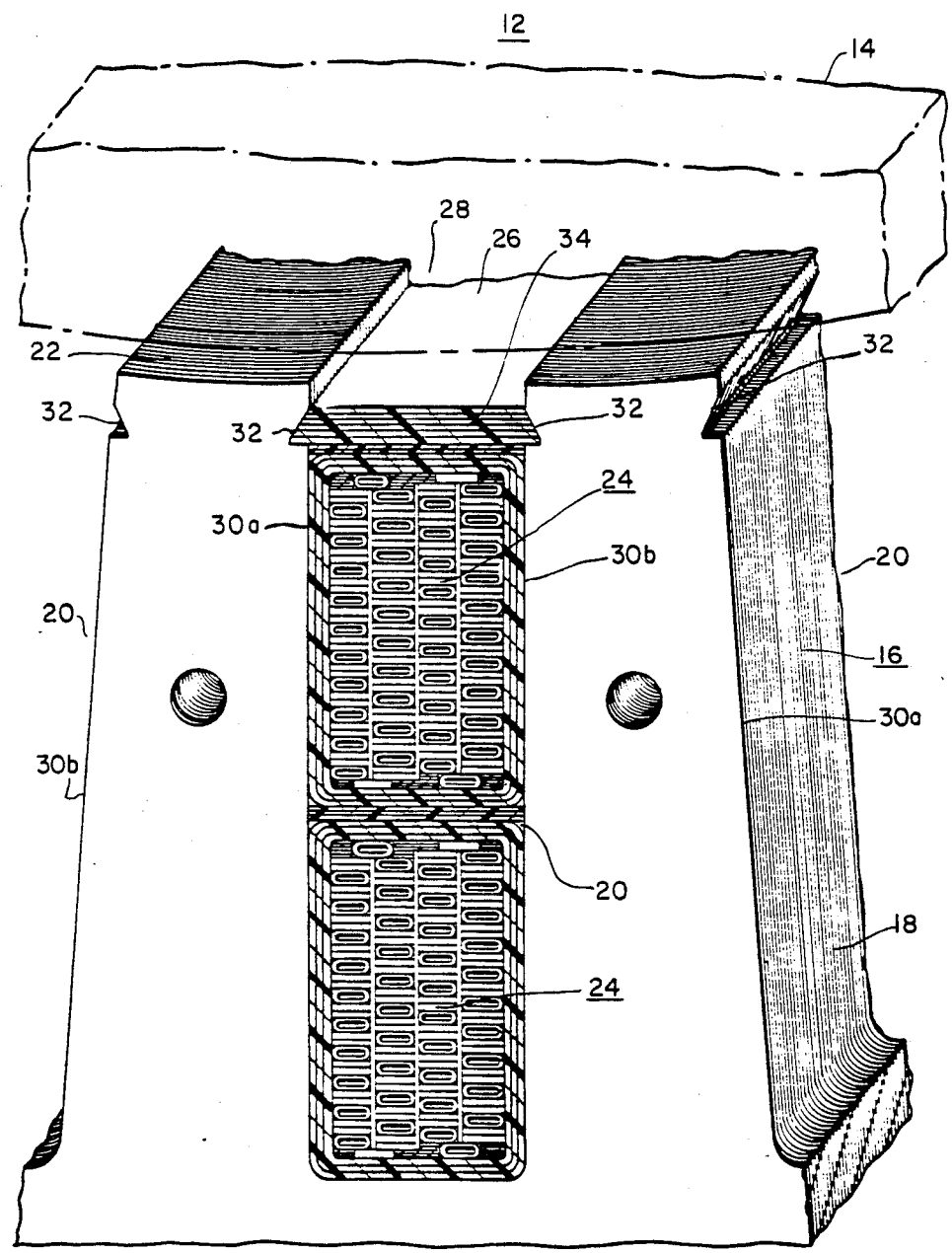
FIG. 1 is a sectional isometric view showing a portion of the stator core and rotor of a dynamoelectric generator.
Figure 2:
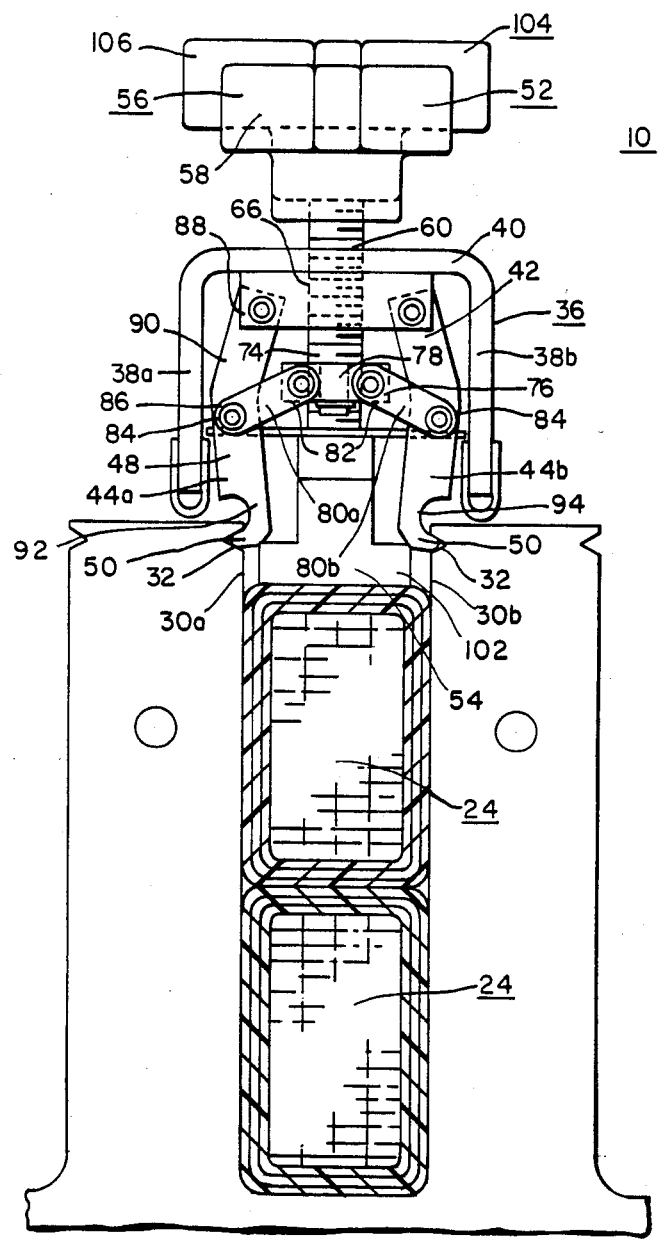
FIG. 2 is a side elevational view showing the apparatus of the present invention engaging the stator core grooves and winding means.
Figure 3:
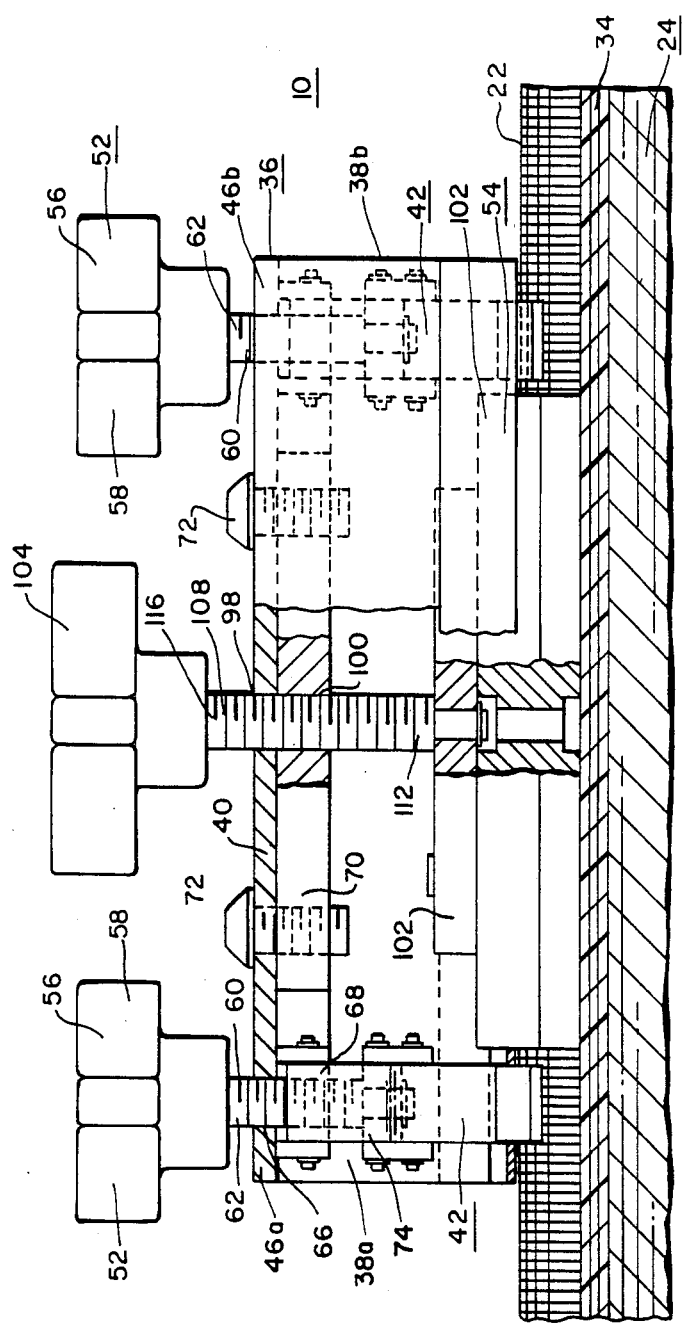
FIG. 3 is a front elevational view of the apparatus of the present invention, partly broken away engaging the stator core grooves and winding means.
Figure 4:
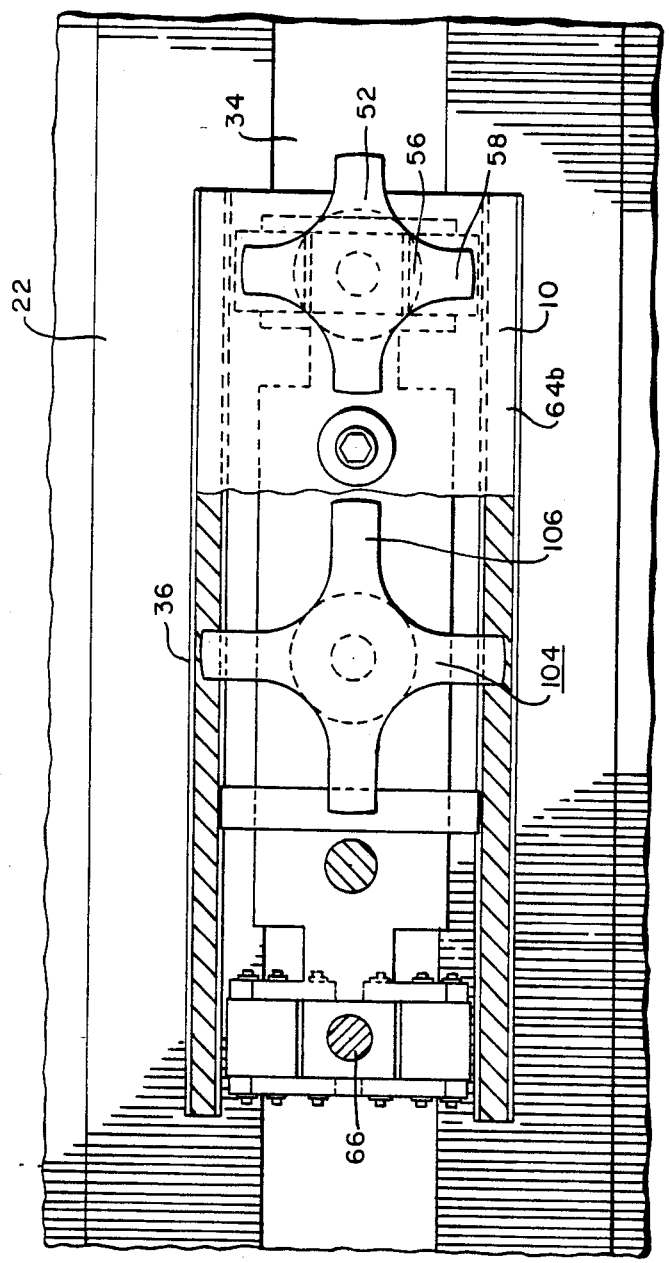
FIG. 4 is a plan view of the apparatus of the present invention in position relative to the stator core slot.

Referring to FIGS. 2-4 there is shown a winding means temporary positioning apparatus 10 for a dynamoelectric generator 12, a small portion of the generator is shown in FIG. 1. The generator 12 comprises a rotor 14, a stator core 16 coaxially encircling the rotor 14. The stator core 16 includes a plurality of thin laminations 18 stacked to form the core 16 as is known in the art. The stator core 16 has a plurality of slots 20 therethrough spaced at equal intervals around the inner diameter 22 of the core 16 as is known in the art. The winding means 24 is positioned in the slots 20 as shown in FIGS. 1-4. Each of the slots 20 at one end 26, proximate the inner diameter 22 of the stator core 16, forming an air gap 28 for magnetic flux. The stator core 16 along opposite sides 30a, 30b of each of the slots 20 proximate the air gap end 26 having a groove 32 of predetermined shape positioned a predetermined distance such as ⅛" from the air gap end 26 of each of the slots 20. Wedge means 34 is engageable in the grooves 32 for maintaining the winding means 24 in position. The generator structure described is conventional.

The winding means temporary positioning apparatus 10 of the present invention comprises a frame means 36. The frame means 36 includes a pair of substantailly parallel wall members 38a, 38b. A top support member 40 is affixed to the wall members 38a, 38b and spaced therebetween such that the wall members 38a, 38b are spaced a predetermined distance such as 2" which is greater than the width of each of the slots 20.

The apparatus 10 further comprises adjustable jaw means 42 comprising a pair of adjustable jaw members 44a, 44b. A pair of adjustable jaw members 44a, 44b are preferably positioned proximate each end 46a, 46b of the top support member 40. A substantial portion 48 of the jaw members 44a, 44b is housed within the frame means 36 as shown in FIG. 2. A first jaw member 44a of a pair of adjustable jaw members 44a, 44b is shaped at the bottom end 50 thereof to engage the stator core groove 32 on one side of each of the slots 20. A second jaw member 44b of the pair of adjustable jaw members 44a, 44b being shaped at the bottom end thereof to engage the stator core groove 32 on the other side 30b of each of the slots 20.

Control means 52 is provided for engaging and disengaging the jaw means in the stator grooves 32. Adjustable pad means 54 is sized to fit within the slots 20 as shown in FIG. 2. The adjustable pad means 54 is adjustable to engage and disengage the winding means 24, whereby during installation of the winding means 24 in each of the slots 20, the jaw members 44a, 44b of the apparatus 10 engage the grooves 32 on opposite sides 30a, 30b of the slots 20 and the pad means 54 is adjusted to engage the winding means 24 to temporarily position the winding means in place until the wedge means 34 is installed.

Preferably the control means 52 comprises first handle means 56. The first handle means 56 includes a first handle member 58 positioned above the top support member 40. The control means 52 further comprises a first threaded shaft member 60 affixed to the first handle member 58 at the top end 62 of the first threaded shaft 60 as shown in FIG. 3. Preferably two first handle means 56 are used one at each end 44a, 44b of the frame means 36. The top member 40 is preferably provided with a first aperture means 66 therethrough in predetermined position shown in FIG. 3. The top member 40 has first threading means 68 about the periphery of the first aperture 66. The top member 40 may include support plate 60 as shown in FIG. 3 where bolts 72 maintain the support plate as an integral part of the top member 40. The first threaded shaft member 60 of the first handle means 56 is positioned as shown in FIG. 3 to pass through the first aperture means 66 and engage the first threading means 68. The first threaded shaft 60 proximate the bottom end 74 has a hinge means 76 affixed thereto. The hinge means 76 comprises a central holding member 78 affixed to the bottom end 74 of the first threaded shaft as shown in FIG. 2. Movable arm members 80a, 80b are affixed at one end 82 to the central holding member 78 and at the other end 84 to one of the jaw members 44a, 44b proximate the center 86 thereof. The arm members 80a, 80b are rotatable at both ends 82, 84 thereof.

Preferably, the jaw members 44a, 44b at the upper ends 88 are affixed to the top member 40. The jaw members 44a, 44b have an upper portion 90 of predetermined length and a lower portion 92 of predetermined length. The lower portion 92 and the upper portion 90 of the jaw members 44a, 44b forming a predetermined angle such as 20° therebetween. The lower portion 92 of the jaw members 44a, 44b on one side thereof closest to one of the wall members 38a, 38b, preferably has a notch 94 therein a predetermined distance such as 7/32" from the bottom end 50 of the jaw member 44a, 44b. The notch 94 is of predetermined size such as ¼" and shape, such as a semicircle, as shown in FIG. 2. An engagement finger 96 is formed in said lower portion 92 of the jaw member 44a, 44b between the notch 94 and the bottom end 50 of the jaw member 44a, 44b. The engagement finger 96 is shaped to engage the stator core groove as shown in FIG. 2.

Preferably, the top member 40 has a second aperture means 98 passing therethrough. The top member 40 has second threading means 100 around the periphery of the second aperture 98. Adjustable pad means 54 comprises a pad member 102 having a width less than the width of each of the slots 20 as shown in FIG. 2. The adjustable pad means 54 further comprises second handle means 104 including a second handle member 106 positioned above the top support member 40. A second threaded shaft member 108 is affixed at the top end 110 thereof to the second handle member 106. The second threaded shaft member engages the second threading means 100. The second threaded shaft member 108 at the bottom end 112 is affixed to the pad member 102.

We claim:

1. A winding means temporary positioning apparatus for a dynamoelectric generator, said generator comprising a rotor, a stator core coaxially encircling said rotor, said stator core including a plurality of thin laminations stacked to form said core, said stator core having a plurality of slots therethrough spaced at equal intervals around the inner diameter of said core, said winding means being positioned in said slots, each of said slots at one end thereof proximate the inner diameter of said stator core forming an air gap for magnetic flux, said stator core along opposite sides of each of said slots proximate said air gap end having a groove of predetermined shape positioned a predetermined distance from said air gap end of each said slots, wedge means engageable in said grooves for maintaining said winding means in position said apparatus comprising:

(a) frame means, said frame means including a pair of substantially parallel wall members, a top support member affixed to said wall members and spaced therebetween such that said wall members are spaced a predetermined distance greater than the width of each of said slots;

(b) adjustable jaw means comprising a pair of adjustable jaw members positioned proximate an end of said top support member with a substantial portion of said jaw members housed within said frame means, a first jaw member of said pair of adjustable jaw members shaped at the bottom end thereof to engage said stator core groove on one side of each of said slots, a second jaw member of said pair of adjustable jaw members being shaped at the bottom end thereof to engage said groove on the other side of each of said slots;

(c) control means for engaging and disengaging said jaw means in said stator grooves;

(d) adjustable pad means sized to fit within said slots and adjustable to engage and disengage said winding means, whereby during installation of said winding means in each of said slots, said jaw members of said apparatus engage said grooves on opposite sides of said slots and said pad means is adjusted to engage said winding means to temporarily position said winding means in place until said wedge means is installed.

2. The apparatus of claim 1, wherein said control means comprises first handle means, said first handle means including a first handle member positioned above said top support member, a first threaded shaft member affixed to said first handle member at the top end thereof.

3. The apparatus of claim 2, wherein said top member has first aperture means therethrough in predetermined position, said top member having first threading means about the periphery of said first aperture means, said first threaded shaft member of said first handle means positioned to pass through said first aperture means and engage said first threading means, said first threaded shaft proximate the bottom end thereof having a hinge means affixed thereto, said hinge means comprising a central holding member affixed to the bottom end of said first threaded shaft, movable arm members affixed at one end thereof to said central holding member and at the other end thereof to one of said jaw members proximate the center thereof, said arm members rotatable at both ends thereof.

4. The apparatus of claim 3, wherein said jaw members at the upper ends thereof are affixed to said top member, said jaw members having an upper portion of predetermined length and a lower portion of predetermined length, said lower portion and upper portion of said jaw members forming a predetermined angle therebetween, said lower portion of said jaw members on one side thereof closest to one of said wall members, having a notch therein a predetermined distance from the bottom end of said jaw member, an engagement finger formed in said lower portion of said jaw member between said notch and the bottom end of said jaw member shaped to engage said stator core groove.

5. The apparatus of claim 1, wherein said top member has a second aperture means passing therethrough said top member having second threading means around the periphery of said second aperture means.

6. The apparatus of claim 5, wherein said adjustable pad means comprises a pad member having a width less than the width of each of said slots, second handle means including a second handle member positioned above said top support member, a second threaded shaft member affixed at the top end thereof to said second handle member, said second threaded shaft member engaging said second threading means, said second threaded shaft member at the bottom and thereof affixed to said pad member.

* * * * *